United States Patent
Kumar et al.

(10) Patent No.: US 12,298,894 B2
(45) Date of Patent: May 13, 2025

(54) FAILURE ANALYSIS AND RECOMMENDATION SERVICE FOR AUTOMATED EXECUTIONS

(71) Applicant: SAP SE, Walldorf (DE)

(72) Inventors: Prakash Kumar, Bangalore (IN); Ravikanth Malipeddu, Bangalore (IN); Santhosh Reddy Mereddy, Nalgonda (IN); Anoop Tharur Lingegowda, Bangalore (IN); Kishan Bhaskar Nagaraj, Bangalore (IN)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 17/514,352

(22) Filed: Oct. 29, 2021

(65) Prior Publication Data

US 2023/0139008 A1 May 4, 2023

(51) Int. Cl.
*G06F 11/36* (2025.01)
*G06F 11/3668* (2025.01)
*G06N 20/00* (2019.01)

(52) U.S. Cl.
CPC ...... *G06F 11/3692* (2013.01); *G06F 11/3664* (2013.01); *G06N 20/00* (2019.01)

(58) Field of Classification Search
CPC .. G06F 11/3692; G06F 11/3664; G06N 20/00

(Continued)

(56) References Cited

U.S. PATENT DOCUMENTS

| | | | |
|---|---|---|---|
| 2011/0154117 A1* | 6/2011 | Danielson | G06F 11/321 715/764 |
| 2015/0089297 A1* | 3/2015 | Johnson | G06F 8/00 714/38.1 |

(Continued)

OTHER PUBLICATIONS

Liu, Chen, et al. "R2Fix: Automatically generating bug fixes from bug reports." 2013 IEEE Sixth international conference on software testing, verification and validation. IEEE, 2013. (Year: 2013).*

(Continued)

*Primary Examiner* — Anil Khatri
*Assistant Examiner* — Joanne G Macasiano
(74) *Attorney, Agent, or Firm* — Sterne, Kessler, Goldstein & Fox P.L.L.C.

(57) ABSTRACT

Disclosed herein are system, method, and computer program product embodiments for implementing failure classification and recommendation delivery. An embodiment operates by receiving, by a failure classification and recommendation system, a plurality of conditions and patterns for a plurality of failures associated with one or more applications/functions automated executions using various tools and receiving one or more recommendations for each one of the plurality of failures. The embodiment further includes storing the plurality of conditions and patterns and the one or more recommendations for each one of the plurality of failures. This embodiment can further include receiving a report from a first tool indicating a failure associated with one or more applications/functions automated executions using the first tool and determining a recommendation based on the received report. A response is sent, by the failure classification and recommendation system, the first tool, where the response includes the recommendation to rectify the failure.

20 Claims, 4 Drawing Sheets

(58) Field of Classification Search
USPC .............................. 717/124–135; 714/37–39
See application file for complete search history.

(56) References Cited

U.S. PATENT DOCUMENTS

| | | | | |
|---|---|---|---|---|
| 2017/0004065 | A1* | 1/2017 | Angwin | G06F 11/34 |
| 2019/0050320 | A1* | 2/2019 | Edri | G06F 11/3636 |
| 2021/0004312 | A1* | 1/2021 | Tanaka | G06Q 10/101 |
| 2021/0357307 | A1* | 11/2021 | Deng | G06N 3/088 |
| 2022/0027257 | A1* | 1/2022 | Harutyunyan | G06N 5/01 |
| 2022/0237104 | A1* | 7/2022 | Davis | G06F 3/0481 |
| 2023/0061513 | A1* | 3/2023 | Gadre | G06N 5/022 |

OTHER PUBLICATIONS

Zhang et al. 2017. Bug report enrichment with application of automated fixer recommendation. In Proceedings of the 25th International Conference on Program Comprehension (ICPC '17). IEEE Press, 230-240. (Year: 2017).*

Hartmann, Björn, et al. "What would other programmers do: suggesting solutions to error messages." Proceedings of the SIGCHI Conference on Human Factors in Computing Systems. 2010. (Year: 2010).*

Feng, Yang, et al. "An empirical study on software failure classification with multi-label and problem-transformation techniques." 2018 IEEE 11th International Conference on Software Testing, Verification and Validation (ICST). IEEE, 2018. (Year: 2018).*

Le Goues, Claire, et al. "Genprog: A generic method for automatic software repair." Ieee transactions on software engineering 38.1 (2011): 54-72. (Year: 2011).*

* cited by examiner

FIG. 4

FAILURE ANALYSIS AND RECOMMENDATION SERVICE FOR AUTOMATED EXECUTIONS

BACKGROUND

Software testing is part of the development process of a software. The testing can be used to determine and remedy any possible failures. Testing the software can include scoping, execution, and analysis of the results. While some automation approaches or tools can be used for executing or testing the software but there are no approaches for automating the analysis of the results of the test to determine and remedy any possible failures. Failure analysis entails cognitive ability and functional expertise with experience to determine the roots of the failure(s) and provide recommendation(s) to remedy the failure(s). Even when a small percentage of an automated test execution fails, the number of failures that need analysis can be significantly large to be processed humanly.

The failure analysis is even more complexed when considering the fast software delivery cycles (e.g., the cloud delivery model), software upgrade tests, custom implementation of the software for different customers based on their business processes and objectives, the vast possibilities of different business flows, the uniqueness of data and system configurations for different customers. These challenges can lead to different results for the software testing for different scenarios used in customer tenants, which can lead to different automated execution flows that result in different patterns of failures. Significant computational resource or significant expertise on software function domain is needed to comprehend and analyze the software execution and failure analysis to recommend corrective actions.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing failure classification and recommendation. For example, some embodiments of this disclosure are directed to providing the failure classification and providing recommendation for the failure for software functionalities. The software functionalities can be for enterprise resource planning (ERP), according to some embodiments. However, the embodiments of this disclosure can used for other functionalities. In some embodiments, the failure analysis (e.g., the failure classification and recommendation) is used for automated execution of a software or software update.

According to some embodiments, the system, apparatus, device, method and/or computer program product embodiments, and/or combinations and sub-combinations thereof of this disclosure can capture many experiences, historical data and patterns, associated interpretation, etc. Such a data set can be used to create a supervised learning of a software, according to some embodiments. As discussed in more detail below, the embodiments of this disclosure can efficiently and effectively analyze one or more failures for a vast number of software's and software functionalities and can provide recommendation(s) to remedy the failures. Therefore, the embodiments of this disclosure can reduce the computational resources, time, and/or human capital needed to analyze failures in current systems. In other words, the amount of time and resources (e.g., computational resources) needed to analyze the execution of a software, to determine failures, to determine sources of the failures, and to prepare recommendations to remedy the failure can be significantly reduced by using the embodiments of this disclosure. In a non-limiting example, the amount of time and resources (e.g., computational resources) needed for consulting issues, functional expertise development, manual analysis of failures, and the like can increase exponentially by the number of tests performed. However, using the embodiments of this disclosure can significantly reduce and nearly flatten the amount of time and resources (e.g., computational resources) needed for consulting issues, functional expertise development, manual analysis of failures, and the like when the number of tests is increased.

Figure 1:
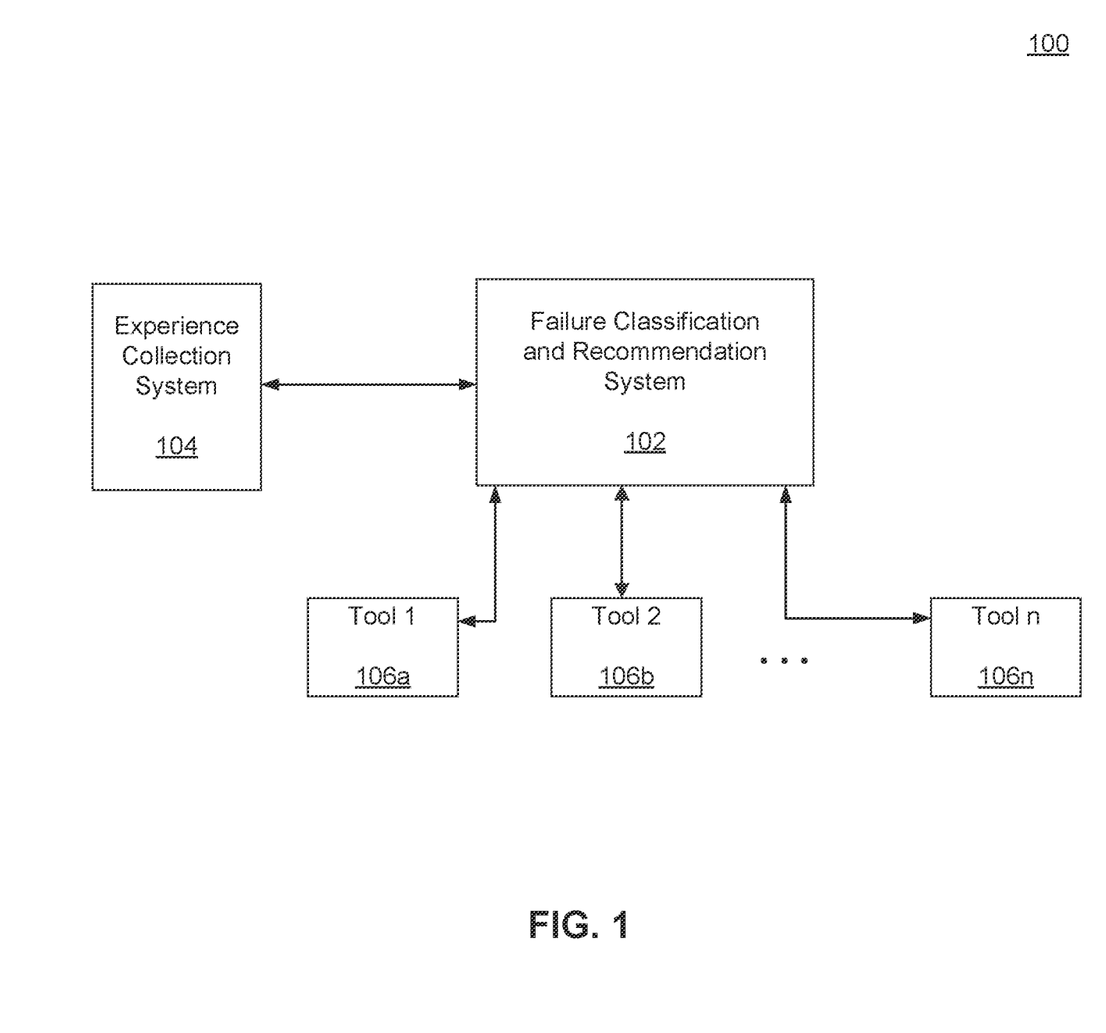
FIG. 1 is a block diagram of an exemplary system for implementing failure classification and recommendation delivery, according to some embodiments.

FIG. 1 is a block diagram of an exemplary system 100 for implementing failure classification and recommendation delivery, according to some embodiments.

According to some embodiments, systems 100 can include failure classification and recommendation system 102, experience collection system 104, and tools 106a-106n. According to some embodiments, experience collection system 104 can be configured to receive one or more conditions and patterns for one or more failures associated with automated execution of an applications/functions with one or more tools (e.g., tools 106a-106n or other tools). In some embodiments, experience collection system 104 can be configured to send the collected conditions and patterns of the failures to failure classification and recommendation system 102. Classification and recommendation system 102 can store and use the collected conditions and patterns of the failures for classifying any failures that occur from applications/functions when executed using any of the tools from tools 106a-106n (collectively referred to as tools 106) and for determining and sending recommendations to remedy the failures of automated execution of an applications/functions using tools 106.

According to some embodiments, many users, customers, engineers, and the like (herein referred to as users) with different levels of expertise and experience can use one or more tools (e.g., tools 106 or other tools). When a user of a tool experiences a failure during automated execution of an applications/functions, the user can report the failure to experience collection system 104. In some embodiments, the reported failure can include one or more conditions and/or one or more patterns associated with the failure. For example, the conditions and patterns of the failure can include a screen shot of a user interface (UI) of automated execution of an applications/functions using a tool when the failure occurred. Additionally, or alternatively, the conditions and patterns can include an error message produced during automated execution of an applications/functions by the tool when the failure occurred. The conditions and patterns can include data, one or more parameters or variables associated with the tool and related to the occurred failure. The conditions and patterns can include functionalities and conditions of the tool that resulted in the failure. The conditions and patterns can include context associated with the failure. The conditions and patterns can include a detailed action log associated with the failure. The conditions and patterns can include keywords associated with the failure. Although some examples of the conditions and patterns are mentioned, the embodiments of this disclosure are not limited to these examples and other conditions and patterns can be used for describing the tool's failure.

According to some embodiments, the experience collection system 104 can send the received conditions and patterns of the failure to failure classification and recommendation system 102 to be stored. Although experience collection system 104 is illustrated in FIG. 1 as a separate entity from failure classification and recommendation system 102, the embodiments of this disclosure are not limited to this example. For example, failure classification and recommendation system 102 and experience collection system 104 can be part of one system. In another example, different subsystems and/or sections failure classification and recommendation system 102 and experience collection system 104 can be combined.

According to some embodiments, in addition to providing the conditions and patterns of the failure, a user can provide one or more recommendations on how to remedy the failure to experience collection system 104. According to some embodiments, the user can provide the one or more recommendations based on user's expertise and experience with the tool and the functionalities of the tool. In some embodiments, experience collection system 104 can send the recommendation to failure classification and recommendation system 102 to be stored and to be used later.

According to some examples, failure classification and recommendation system 102 can store one or more conditions and patterns for each failure of a plurality of failures. Similarly, failure classification and recommendation system 102 can store one or more recommendations for each failure of the plurality of failures. Additionally, failure classification and recommendation system 102 can include (and use) a machine learning model. The conditions and patterns and the recommendations can be used to train the machine learning of failure classification and recommendation system 102.

According to some embodiments, a customer of tool 106a (as a non-limiting example) can experience a failure during automated execution of an applications/functions using a tool 106a. According to some embodiments, the failure is of an application/function created by tool 106. For example, a test created using tool 106 when executed results in the failure of the test. When the failure occurs, tool 106a can generate and transmit a report to failure classification and recommendation system 102. According to some embodiments, the report can include at least one of one or more conditions or one or more patterns associated with the failure occurred at the application/function created by tool 106a. When failure classification and recommendation system 102 receives the report, failure classification and recommendation system 102 can determine (e.g., extract) the conditions and/or the patterns associated with the failure. Failure classification and recommendation system 102 can then determine whether one or more stored conditions or patterns correspond to the received conditions or patterns associated with the failure.

If failure classification and recommendation system 102 determines that one or more conditions or patterns corresponding to the received conditions or patterns associated with the failure are stored, failure classification and recommendation system 102 can determine one or more recommendations for the failure. In some examples, failure classification and recommendation system 102 can determine that the stored one or more conditions or patterns are the same as (or substantially the same as) the received conditions or patterns associated with the failure. After determining the recommendation, failure classification and recommendation system 102 can generate and transmit a response to tool 106a. The response can include the recommendation for remedying the failure.

According to some embodiments, if the stored one or more conditions or patterns are not the same as (or are not substantially the same as) the received conditions or patterns associated with the failure, failure classification and recommendation system 102 can use a machine learning model to determine an estimated condition or pattern for the receive one or more conditions and patterns associated with the failure a. Using the estimated condition or pattern, failure classification and recommendation system 102 determine one or more recommendations for the failure. After determining the recommendation, failure classification and recommendation system 102 can generate and transmit the response to tool 106a. The response can include the recommendation to remedy the failure occurred during automated execution of an applications/functions using a tool 106a.

According to some embodiments, after transmitting the response to tool 106a, failure classification and recommendation system 102 can receive a feedback message from tool 106a. In one example, the feedback message can indicate that the recommendation remedied the failure that occurred during automated execution of an applications/functions using a tool 106a. In another example, the feedback message can indicate that the recommendation did not remedy the failure. In this example, the negative feedback message can include further information (e.g., conditions or patterns) of the second failure. According to some embodiments, failure classification and recommendation system 102 can use the feedback message to further revise its stored conditions, patterns, or recommendations for the failure.

In a non-liming example, tool 106 can include one or more of intelligent robotic process automation tools, test automation tools, cloud test automation tools, post upgrade test tools, post upgrade test concepts and dashboard, process automation tools, chat bots, virtual assistants, chat bots virtual assistants, functional consultant community portals, and the like. The embodiments of this disclosure are not limited to these examples, and tool 106 can include any other tools.

In some embodiments, tools 106 can be used to create automated tests to verify functional/non-functional accuracy of applications. When such automated tests are executed, they can result in a failure of the tests. The failures can then be categorized based on the patterns and then recommendations can be shared so that users can follow to rectify the failed tests before re-executing the tests. Therefore, the conditions and/or the patterns of the failures can be generic across tools 106 and experience collection system 104 can be re-usable across tools 106 increasing re-usability of the patterns and recommendations maintained in experience collection system 104. Thus, the patterns and recommendations can be tool agonistic, according to some embodiments. In other words, patterns maintained in experience collection system 104 can be consumed across tools 106 (irrespective of the tool used for automated test executions of one or more applications/functions). As these patterns are maintained as generic for functional areas, using different tools 106 for running automated tests on same or similar applications can result in re-using same recommendations irrespective of tools 106 used, according to some embodiments. For example, a pattern maintained in experience collection system 104 for tool 106a can be consumed by tool 106b (e.g., patterns and recommendations are shared across tools 106).

Figure 2:
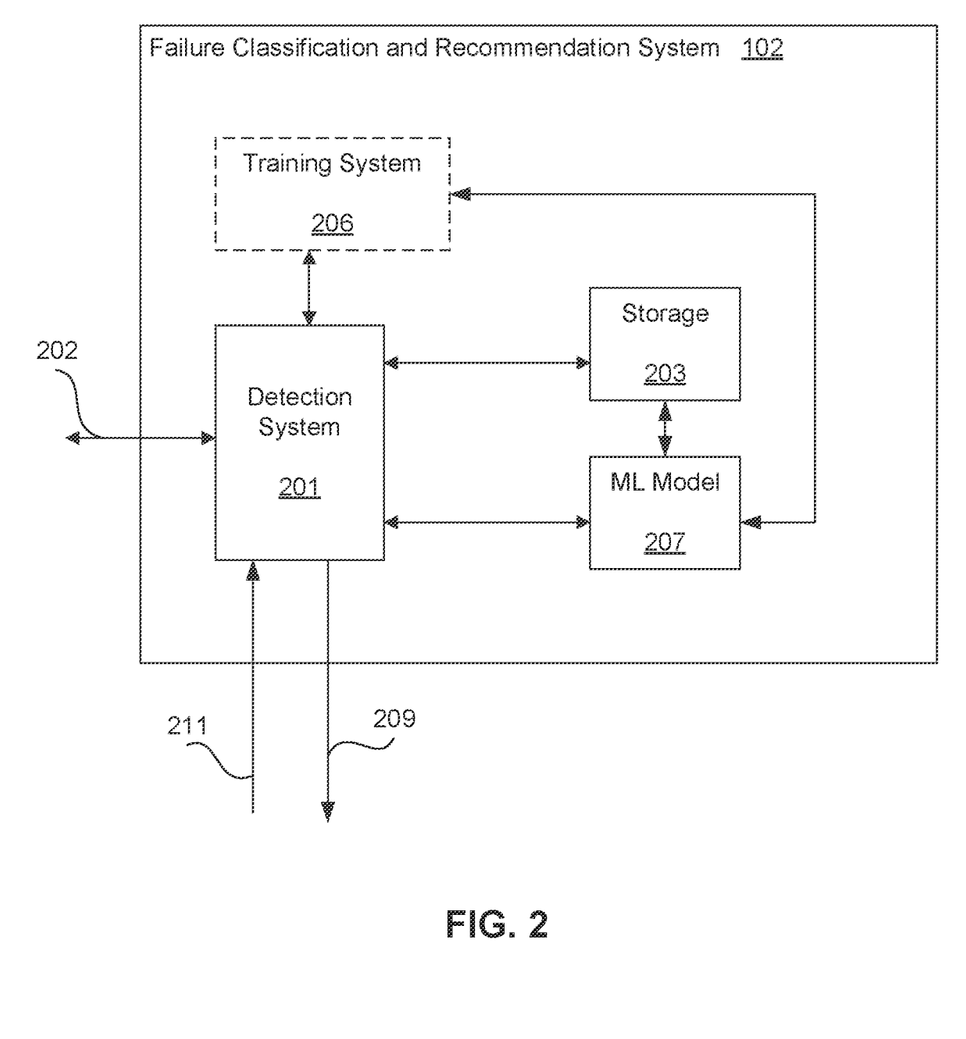
FIG. 2 is a block diagram of an exemplary failure classification and recommendation system, according to some embodiments.

FIG. 2 is a block diagram of an exemplary failure classification and recommendation system 102, according to some embodiments. Failure classification and recommendation system 102 can include detection system 201, storage 203, training system 206, and machine learning (ML) model 207.

According to some embodiments, failure classification and recommendation system 102 (or more specifically, detection system 201) can be coupled to experience collection system 104 using 202 to receive conditions, patterns, or recommendation. After receiving the conditions, patterns, or recommendation, detection system 201 can store the conditions, patterns, or recommendation in storage 203. In some examples, storage 203 can include any data storage/repository device, such as, but not limited to, in-memory, a queue, a buffer, a database, and the like.

Additionally, or alternatively, detection system 201 can use the received conditions, patterns, or recommendation to train ML model 207 using optional training system 206. In some examples, optional training system 206 can receive the conditions, patterns, or recommendation received from experience collection system 104 and use the received conditions, patterns, or recommendation to train ML model 207. For example, training system 206 can train ML model 207 based on at least one of the received conditions and patterns for each one of the plurality of failures or the received one or more recommendations for each one of the plurality of failures that detection system 201 has received from experience collection system 104. ML model 207 and/or information and data associated with ML model 207 can be stored in storage 203.

According to some examples, ML 207 can include artificial intelligence and machine learning techniques and technologies. In some examples, ML 207 can include natural language processing techniques and technologies. In some examples, ML 207 can include vector quantization methods, such as, but not limited to, k-means clustering. In some examples, ML 207 can include a Naïve Bayes classifier, which may apply Bayes theorem. In some examples, ML model 207 can include a random forest or random decision forests classifier, which may operate based on decision tree. Additionally, or alternatively, ML model 207 can include supervised ML algorithms. For example, ML model 207 can include support-vector machines classifier (SVMs, or support-vector networks), such as but not limited to, Maximal Margin classifier, one-of or one-vs-all classifier, linear SVM, nonlinear classifier, support-vector clustering, multiclass SVM, transductive SVM, structured SVM, regression SVM, Bayesian SVM, or the like. In some examples, ML model 207 can include systems using cosine similarity, systems using word mover's distance, etc. Although exemplary classifiers are provided for ML 207, the embodiments of this disclosure are not limited to these examples and other artificial intelligence and machine learning techniques and technologies and other classifiers using, for example, neural networks can also be used.

According to some embodiments, detection system 201 can receive report 211 from, for example, tool 106a of FIG. 1. Report 211 can include or indicate a failure associated with tool 106a. For example, reports 211 can include at least one of one or more conditions associated with the failure of application(s)/function(s) created by tool 106a or one or more patterns associated with the failure of application(s)/function(s) created by tool 106a.

According to some embodiments, detection system 201 can determine a recommendation for the failure based on report 211. In some embodiments, detection system 201 can search storage 203 that store a plurality of conditions and patterns for a plurality of failures for the at least one of the one or more conditions associated with the failure of the tool 106a or the one or more patterns associated with the failure of the tool 106a.

Additionally, or alternatively, detection system 201 can determine the recommendation for the failure indicated in report 211 by applying ML model 207 to the at least one of the one or more conditions associated with the failure of application(s)/function(s) created by tool 106a or the one or more patterns associated with the failure.

According to some embodiments, detection system 201 can determine the recommendation for the failure indicated in report 211 by, for example, determining a category of failure based on the at least one of the one or more conditions associated with the failure or the one or more patterns associated with the failure. Detection system 201 can further determine the recommendation based on the determined category of the failure. In some examples, the determined recommendation is specific to the determined category or is specific to the at least one of the one or more conditions associated with the failure or the one or more patterns associated with the failure.

According to some embodiments, after determining the recommendation, detection system 201 can send response 209 to tool 106a Response 209 can include the determined recommendation.

Additionally, detection system 201 can further receive feedback from tool 106a regarding the recommendation provided in response 209. The feedback can indicate whether the provided recommendation has remedied the failure or not. Based on the received feedback, detection system 201 can further revise information store in storage 203 and/or retrain or revise ML model 207.

According to some embodiments, in addition to the conditions or patterns stored in storage 203, other information associated with different failures can also be stored in storage 203. For example, for each failure, storage 203 can store one or more of associated conditions, associated patterns, one or more category of the failure, one or more products where the failure occurred, one or more areas of the product (e.g., sales, finance, etc.), accountability information (e.g., failure occurred by customer, failure occurred by a system etc.), a number of conditions or patterns corresponding to the category, one or more recommendations for the failure, information associated with the creator(s) of the failure and/or the recommendation, and the like.

Figure 3:
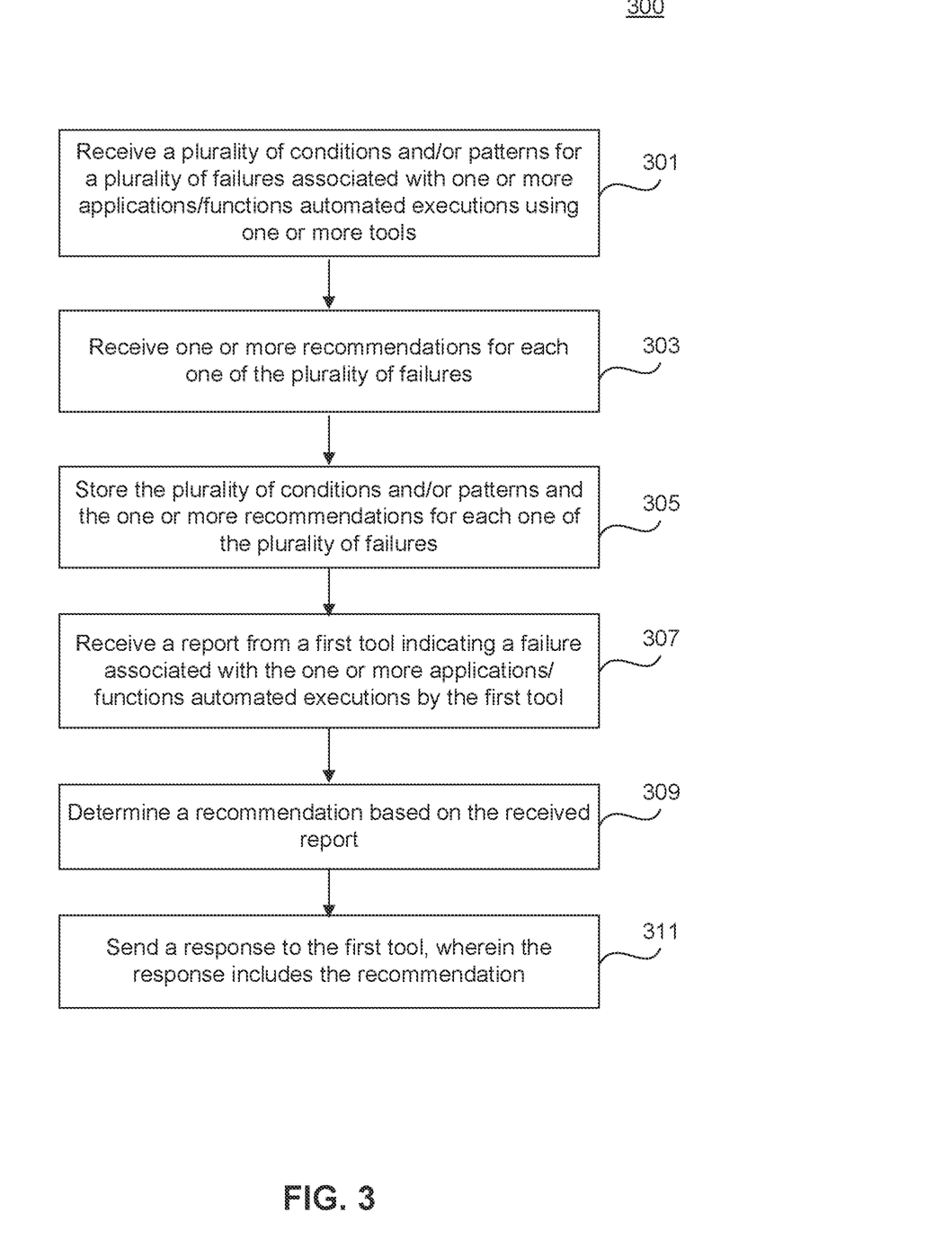
FIG. 3 is a flowchart illustrating example operations of a failure classification and recommendation system, according to some embodiments.

FIG. 3 is a flowchart illustrating example operations of a failure classification and recommendation system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to the example embodiments.

In 301, a plurality of conditions and/or patterns for a plurality of failures associated with one or more applications/functions when executed using one or more tools are received. For example, failure classification and recommendation system 102 can receive the plurality of conditions or patterns for the plurality of failures from, for example, experience collection system 104. According to some embodiments, one or more failures that can occur with one or more applications/functions during automated executions for each tool for which failure classification and recommendation system 102 is used. For each failure, failure classification and recommendation system 102 can receive information associated with the failure. The information associated with the failure can include, but is not limited to, one or more conditions associated with the failure, one or more patterns associated with the failure, one or more categories of the failure, information associated with when the failure occurred, parameters and data that may have caused the failure, information associated with the tool where the failure occurred, and the like. In some examples, information associated with the tool where the failure occurred can include, but is not limited to, one or more products where the failure occurred, one or more areas of the product (e.g., sales, finance, etc.) where the failure occurred, accountability information (e.g., failure occurred by customer, failure occurred by a system etc.), and the like.

In 303, one or more recommendations for each one of the plurality of failures are received. For example, failure classification and recommendation system 102 can receive the one or more recommendations for each of the failures. Additionally, failure classification and recommendation system 102 can receive information associated with the creator(s) of the failure and/or the recommendation and the like. In this example, for each failure that failure classification and recommendation system 102 receives the information associated with the failure, failure classification and recommendation system 102 can also receive one or more recommendations on how to resolve and remedy the failure.

At 305, the information associated with the failure and/or the one or more recommendation are stored. For example, the plurality of conditions or patterns and the one or more recommendations for each one of the plurality of failures are stored. In some examples, failure classification and recommendation system 102 can store the information associated with the failure and corresponding recommendation(s) in, for example, storage 203. This information can further be used by failure classification and recommendation system 102 for classifying failures that failure classification and recommendation system 102 receives from customers and for providing recommendations to remedy the failure.

At 307, a report is received from a first tool indicating a failure associated with the one or more applications/functions automated executions. The failure associated with the one or more applications/functions is a failure that occurred while using the first tool for automated executions. Failure classification and recommendation system 102 can receive a report (e.g., report 211) from tool 106a. According to some embodiments, the report received from the first tool can indicate that the failure occurred in one or more applications/functions when executed using the first tool. For example, the failure occurred in when a test created on one or more applications/functions using the first tool was executed. The report can also include information associated with the failure. The information associated with the failure can include, but is not limited to, at least one of one or more conditions associated with the failure or one or more patterns associated with the failure. The received report can also include additional information associated with the failure associated with one or more applications/functions automated executions using the first tool.

At 309, a recommendation is determined based on the received report. For example, failure classification and recommendation system 102 can use the information within the received report to determine the recommendation for resolving the failure associated with one or more applications/functions when executed using the first tool. According to some embodiments, operation 309 can include determining whether the same (e.g., a one-to-one mapping or substantially the same) failure associated with the first tool exists in, for example, storage 203 of failure classification and recommendation system 102. In this example, failure classification and recommendation system 102 can use the information of the failure associated with the first tool received in the report to compare with the information of the failures that failure classification and recommendation system 102 stores. In some examples, the comparison can include textual comparison, image (e.g., screen shot) comparison, and the like. However, the embodiments of this disclosure are not limited to these examples and other methods of comparison can be used.

If the same (e.g., a one-to-one mapping or substantially the same) failure exists, failure classification and recommendation system 102 can determine and use the corresponding stored recommendation. For example, failure classification and recommendation system 102 can search within the plurality of conditions and patterns for the plurality of failures that are stored for the at least one of the one or more conditions associated with the failure or the one or more patterns associated with the failure.

Additionally, or alternatively, if the same (or substantially the same) failure is not stored by failure classification and recommendation system 102, machine learning processes can be used to determine a recommendation for the failure. For example, failure classification and recommendation system 102 can use ML model 207 to determine a stored failure that as an estimate failure (e.g., the "closest" failure) for the failure associated with the one or more applications/functions automated executions using first tool received in the report. After determining the estimate failure, failure classification and recommendation system 102 can determine the recommendation for the estimate failure. This recommendation can also be used for the received failure associated with one or more applications/functions automated executions using the first tool.

According to some embodiments, method 300 can also include training, by failure classification and recommendation system 102, the ML model (e.g., ML model 207) based on at least one of the received one or more conditions and/or patterns for each one of the plurality of failures or the received one or more recommendations for each one of the plurality of failures. Operation 309 can include applying, by failure classification and recommendation system 102, the ML model to the at least one of the one or more conditions associated with the failure or the one or more patterns associated with the failure.

Additionally, or alternatively, operation 309 can also include determining a category of failure for the failure associated with one or more applications/functions while using the first tool based on the information associated with the failure. For example, failure classification and recommendation system 102 can determine the category of the failure based on, for example, at least one of the one or more conditions associated with the failure associated with one or more applications/functions when executed using the first tool or the one or more patterns associated with the failure associated with one or more applications/functions when executed using the first tool. Operation 309 can further include determining the recommendation based on the determined category of failure. For example, failure classification and recommendation system 102 can determine the category of the failure, can compare the determined category with the stored categories in, for example, storage 203, can determine a stored failure (same/substantially the same or estimated (using ML model)) based on the determined category, and can determine the recommendation based on the determined stored failure. In some examples, the recommendation is specific to the determined category. Additionally, or alternatively, the recommendation can be specific to the at least one of the one or more conditions associated with the failure or the one or more patterns associated with the failure.

According to some embodiments, method 300 can include an additional operation between operations 307 and 309. In this example, after receiving the report from the first tool that indicates the failure of one or more applications/functions automated executions using the first tool, failure classification and recommendation system 102 may determine that no such failure (e.g., the same failure, substantially the same failure, or an estimated failure) exists in, for example, storage 203. In this example, instead of (or in addition to) operations 309 and 311, method 300 can further include creating a new failure and/or a new category of failures based on the received failure. Additionally, method 300 can further include prompting the customer of the first tool or a manager/user of failure classification and recommendation system 102 to provide one or more recommendations for the new failure and/or the new category of failures. Therefore, failure classification and recommendation system 102 can update its storage 203 based on new failures.

At 311, a response is sent to the first tool, where the response includes the recommendation. For example, failure classification and recommendation system 102 can prepare and send the response to the first tool based on the recommendation determined at 309. The recommendation can be used by the first tool (e.g., tool 106*a*) and/or the customer using the first too to remedy the failure.

According to some embodiments, after transmitting the response to the first tool, method 300 can also include receiving a feedback message from the first tool. Method 300 can further include using the received feedback message to further revise the stored conditions, patterns, and/or recommendations for the failure.

Figure 4:
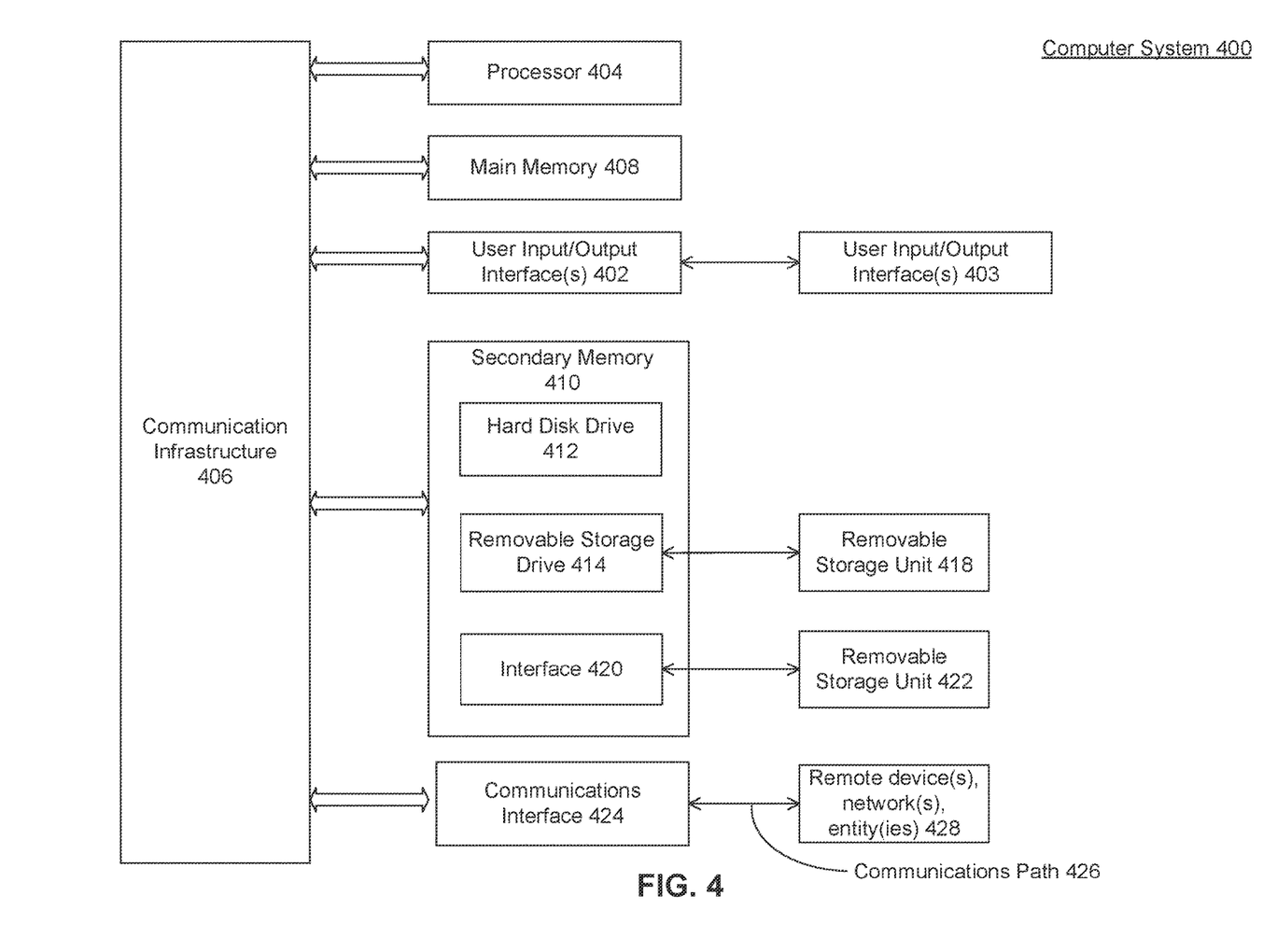
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities, or other approaches for allowing computer programs and/or other instructions and/or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus, or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method comprising:
receiving, by a failure classification and recommendation system, a plurality of categories and a plurality of conditions and patterns for a plurality of failures associated with one or more applications/functions during automated executions using one or more tools, wherein the plurality of categories each comprises a plurality of patterns;
receiving, by the failure classification and recommendation system, one or more recommendations for each one of the plurality of failures;
storing, by the failure classification and recommendation system, the plurality of conditions and patterns and the one or more recommendations for each one of the plurality of failures;
receiving, by the failure classification and recommendation system, a report from a first tool indicating a failure associated with the one or more applications/functions during automated executions using the first tool;
determining, by the failure classification and recommendation system, whether a stored failure corresponding to the failure associated with the one or more applications/functions exist;
in response to determining that the stored failure exists, determining, by the failure classification and recommendation system, a recommendation for remedying the failure based on the received report, wherein the determining the recommendation based on the received report comprises:
determining, by the failure classification and recommendation system, a category of failure based on at least one of one or more conditions associated with the failure or one or more patterns associated with the failure; and determining, by the failure classification and recommendation system, the recommendation based on the determined category of failure;

in response to determining that the stored failure does not exist, creating, by the failure classification and recommendation system, the category of failure based on the failure associated with the one or more applications/functions; and creating, by the failure classification and recommendation system, a prompt for the recommendation for remedying the failure for the created category of failure; and sending, by the failure classification and recommendation system, a response to the first tool, wherein the response includes the recommendation.

2. The method of claim 1, wherein the report received from the first tool indicating the failure associated with the one or more applications/functions automated executions using the first tool comprises the at least one of the one or more conditions associated with the failure or the one or more patterns associated with the failure.

3. The method of claim 2, wherein the determining the recommendation based on the received report comprises:

searching, by the failure classification and recommendation system, within the plurality of conditions and patterns for the plurality of failures for the at least one of the one or more conditions associated with the failure or the one or more patterns associated with the failure.

4. The method of claim 2, further comprising:

training, by the failure classification and recommendation system, a machine learning model based on at least one of the received one or more conditions and the one or more patterns for each one of the plurality of failures or the received one or more recommendations for each one of the plurality of failures.

5. The method of claim 4, wherein the determining the recommendation based on the received report comprises:

applying, by the failure classification and recommendation system, the machine learning model to the at least one of the one or more conditions associated with the failure or the one or more patterns associated with the failure.

6. The method of claim 1, wherein the recommendation is specific to the determined category of failure or is specific to the at least one of the one or more conditions associated with the failure or the one or more patterns associated with the failure.

7. A failure classification and recommendation system comprising:

a memory; and at least one processor coupled to the memory and configured to:

receive a plurality of categories and a plurality of conditions and patterns for a plurality of failures associated with one or more applications/functions automated executions using one or more tools, wherein the plurality of categories each comprises a plurality of patterns;

receive one or more recommendations for each one of the plurality of failures;

store the plurality of conditions and patterns and the one or more recommendations for each one of the plurality of failures;

receive a report from a first tool indicating a failure associated with the one or more applications/functions automated executions using the first tool;

determine whether a stored failure corresponding to the failure associated with the one or more applications/functions exist;

in response to determining that the stored failure exists, determine a recommendation for remedying the failure based on the received report by:

determining a category of failure based on at least one of one or more conditions associated with the failure or one or more patterns associated with the failure of; and determining the recommendation based on the determined category of failure;

in response to determining that the stored failure does not exist, create the category of failure based on the failure associated with the one or more applications/functions; and create a prompt for the recommendation for remedying the failure for the created category of failure; and send a response to the first tool, wherein the response includes the recommendation.

8. The failure classification and recommendation system of claim 7, wherein the report received from the first tool indicating the failure associated with the one or more applications/functions automated executions using the first tool comprises the at least one of the one or more conditions associated with the failure or the one or more patterns associated with the failure.

9. The failure classification and recommendation system of claim 8, wherein to determine the recommendation based on the received report, the processor is configured to:

search within the plurality of conditions and patterns for the plurality of failures for the at least one of the one or more conditions associated with the failure or the one or more patterns associated with the failure.

10. The failure classification and recommendation system of claim 8, wherein the processor is further configured to:

train a machine learning model based on at least one of the received one or more conditions and the one or more patterns for each one of the plurality of failures or the received one or more recommendations for each one of the plurality of failures.

11. The failure classification and recommendation system of claim 10, wherein to determine the recommendation based on the received report, the processor is configured to:

apply the machine learning model to the at least one of the one or more conditions associated with the failure or the one or more patterns associated with the failure.

12. The failure classification and recommendation system of claim 7, wherein the recommendation is specific to the determined category or is specific to the at least one of the one or more conditions associated with the failure or the one or more patterns associated with the failure.

13. A non-transitory computer-readable device having instructions stored thereon that, when executed by at least one computing device of a failure classification and recommendation system, cause the at least one computing device to perform operations comprising:

receiving a plurality of categories and a plurality of conditions and patterns for a plurality of failures associated with one or more applications/functions automated executions using one or more tools, wherein the plurality of categories each comprises a plurality of patterns;

receiving one or more recommendations for each one of the plurality of failures;

storing the plurality of conditions and patterns and the one or more recommendations for each one of the plurality of failures;

receiving a report from a first tool indicating a failure associated with the one or more applications/functions automated executions using the first tool;

determining whether a stored failure corresponding to the failure associated with the one or more applications/functions exist;

in response to determining that the stored failure exists, determining a recommendation for remedying the failure based on the received report, wherein the determining the recommendation based on the received report comprises:

determining a category of failure based on at least one of one or more conditions associated with the failure or one or more patterns associated with the failure; and     determining the recommendation based on the determined category of failure;

in response to determining that the stored failure does not exist, creating the category of failure based on the failure associated with the one or more applications/functions; and     creating a prompt for the recommendation for remedying the failure for the created category of failure; and sending a response to the first tool, wherein the response includes the recommendation.

14. The computer-readable device of claim 13, wherein the report received from the first tool indicating the failure associated with the one or more applications/functions automated executions using the first tool comprises the at least one of the one or more conditions associated with the failure or the one or more patterns associated with the failure.

15. The computer-readable device of claim 14, wherein the determining the recommendation based on the received report comprises:

searching within the plurality of conditions and patterns for the plurality of failures for the at least one of the one or more conditions associated with the failure or the one or more patterns associated with the failure.

16. The computer-readable device of claim 14, the operations further comprising:

training a machine learning model based on at least one of the received one or more conditions and the one or more patterns for each one of the plurality of failures or the received one or more recommendations for each one of the plurality of failures.

17. The computer-readable device of claim 16, the operations further comprising:

applying the machine learning model to the at least one of the one or more conditions associated with the failure or the one or more patterns associated with the failure.

18. The computer-readable device of claim 13, wherein the recommendation is specific to the determined category of failure or is specific to the at least one of the one or more conditions associated with the failure or the one or more patterns associated with the failure.

19. The computer-readable device of claim 13, wherein the determining the recommendation based on the determined category of failure comprises:

comparing the determined category of failure with one or more stored categories;

determining a stored failure from the plurality of failures based on the determined category; and     determining the recommendation based on the determined stored failure.

20. The computer-readable device of claim 19, wherein the stored failure is the same as the failure associated with the one or more applications/functions automated executions using the first tool.

\* \* \* \* \*